April 29, 1947.  F. M. RUSHMORE  2,419,597
PLOTTING INSTRUMENT
Filed March 29, 1944  2 Sheets-Sheet 1

Inventor
Francis M. Rushmore
By *Francis R. Vandewerker and Joseph N. Emma*
Attorneys April 29, 1947. F. M. RUSHMORE 2,419,597
PLOTTING INSTRUMENT
Filed March 29, 1944 2 Sheets-Sheet 2
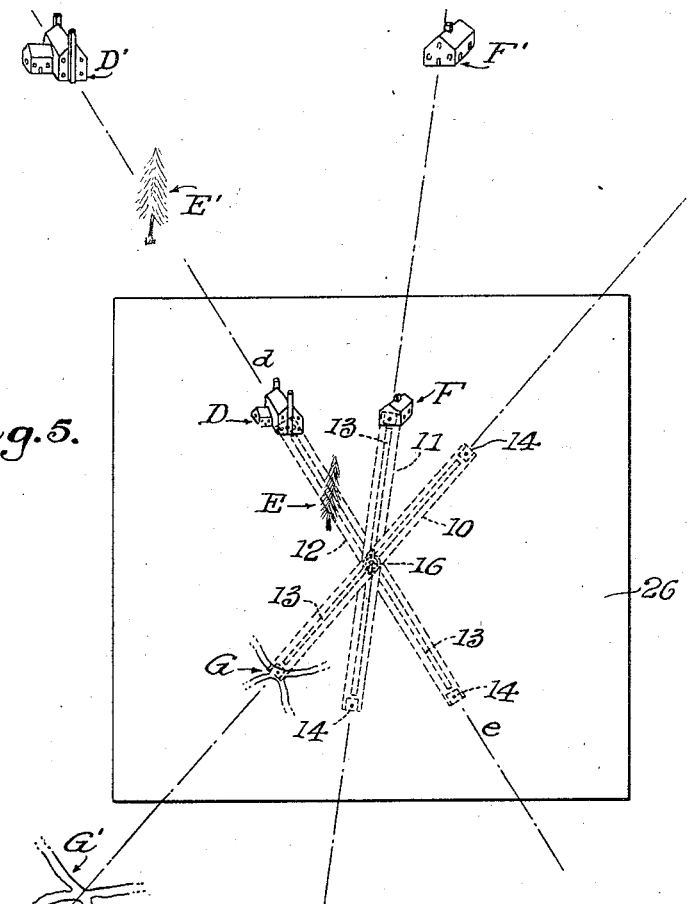
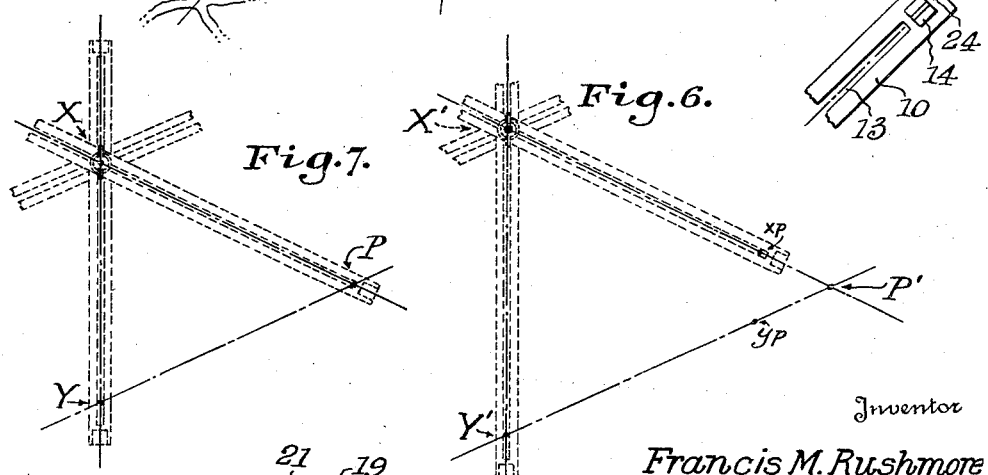
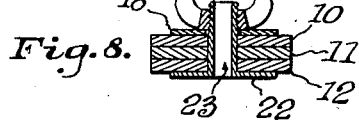
Inventor
Francis M. Rushmore
Attorneys Patented Apr. 29, 1947

2,419,597

UNITED STATES PATENT OFFICE 2,419,597

PLOTTING INSTRUMENT

Francis M. Rushmore, United States Army

Application March 29, 1944, Serial No. 528,546

4 Claims. (Cl. 33—65)

(Granted under the act of March 3, 1883, as amended April 30, 1928; 370 O. G. 757)

The invention described herein may be manufactured and used by or for the Government for governmental purposes, without payment to me of any royalty thereon.

The present invention relates to a plotting instrument and more particularly to a plotting instrument for solving problems of position finding or orientation on a map and for effecting a transfer of a point from one map or photograph to another.

An object of the present invention is to provide a plotting instrument to simplify and reduce the time required to orient a position on a map. Another object is to enable restitution of a point from one map to a second map without the use of tracing paper. Other objects and advantages will be apparent from the following description and the accompanying drawings in which:

Figure 5 illustrates another method of using the plotting instrument for orientaion;

Figures 6 and 7 illustrate a method of using the plotting instrument for restitution;

Figure 8 illustrates a modified construction for the plotting instrument, and

Figure 9 illustrates another modified construction for the plotting instrument.

Figure 4:
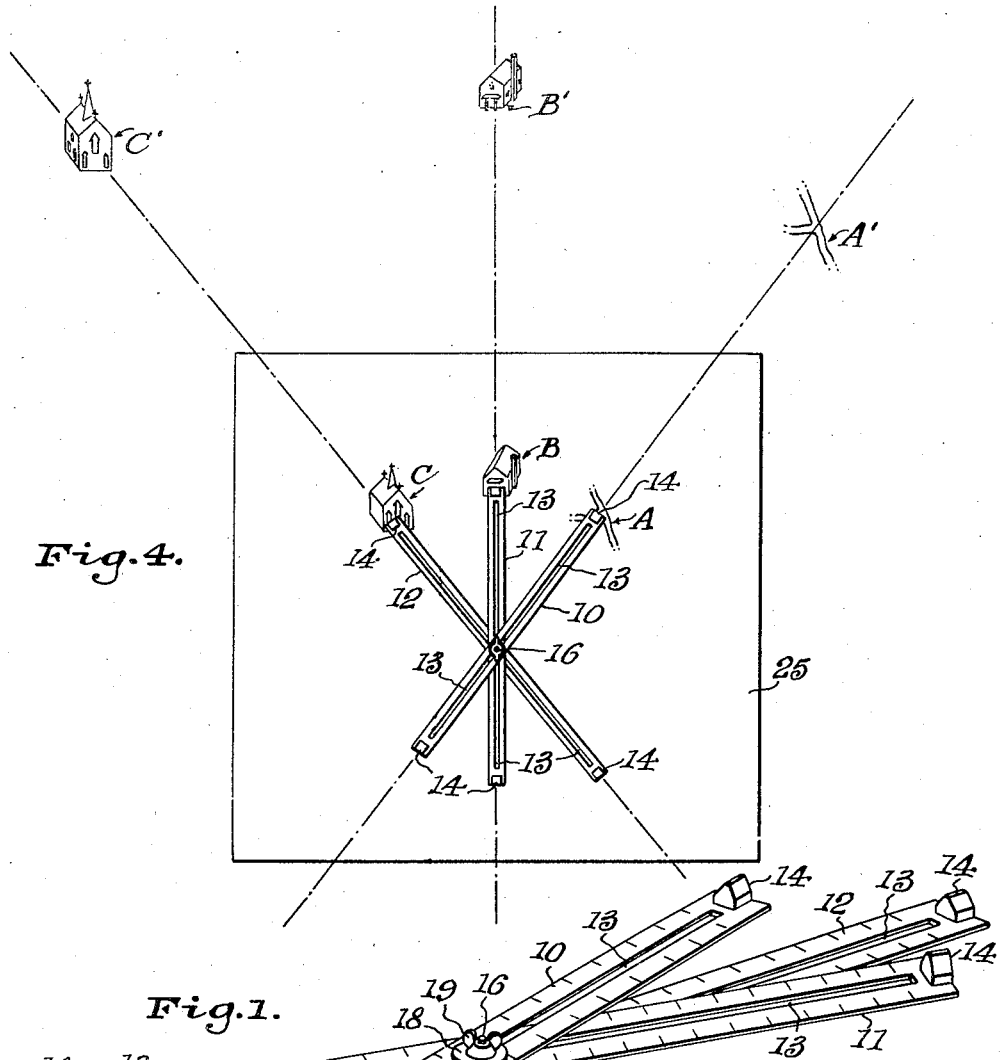
Figure 4 illustrates one method of using the plotting instrument for orientation.
Figure 1:
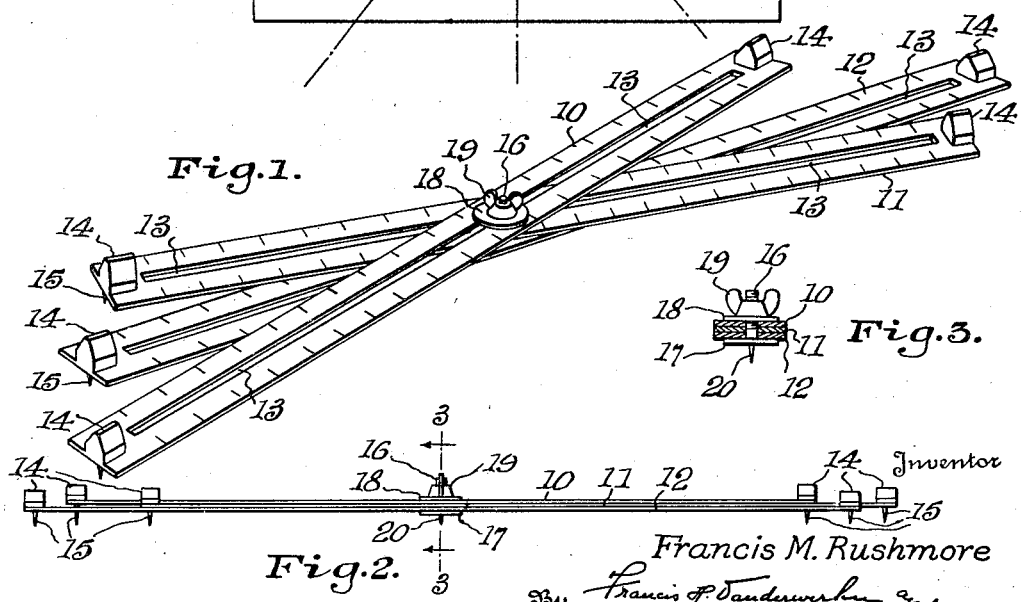
Figure 1 is a perspective view of a plotting instrument in accordance with the invention.
Figure 3:
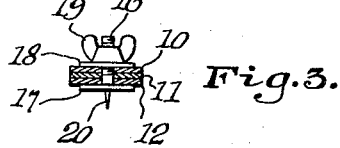
Figure 3 is a partial section view taken along the line 3—3 of Figure 2.
Figure 2:
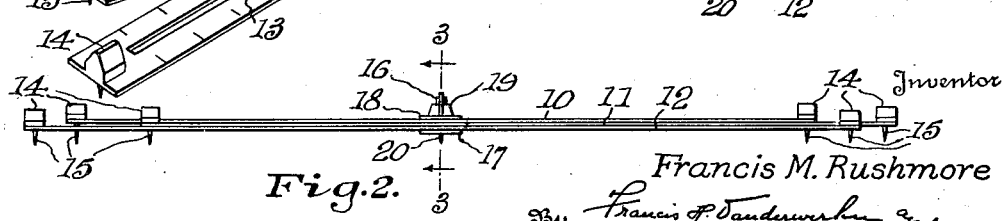
Figure 2 is a side view of the plotting instrument shown in Figure 1.

Referring to the drawings in detail the plotting instrument consists of three arms 10, 11 and 12, each of which has a centrally located elongated slot 13 along its length. At the ends of each of the arms there are sights 14 extending from one side of the arm and positioning means in the form of pins 15 extending from the other side of the arm. The sights 14 and the positioning pins 15 are located in line with the center line of the slots or openings 13.

A movable position indicating member 16, the position of which is controlled by movement of the arms 10, 11 and 12, holds the arms in cooperative relation. The position indicating member 16 has a headed portion 17 which extends over the bottom face of the lower arm adjacent the opening 13. A washer 18 and a wing nut 19 engage with a portion of the member 16 which extends through the openings 13 in the arms. The washer 18 bears against the top face of the upper arm adjacent the opening 13 and the wing nut 19 may be adjusted to permit movement of the arms or to secure them in fixed relative positions. When the wing nut 19 is loosened, the arms may be moved both longitudinally and pivotally in relation to each other.

A pin 20 extending from the head 17 of the member 16 constitutes a position marking device. The pin 20 is also located on the center line of the elongated opening 13 in the arms. The pin 20 is preferably somewhat shorter than the arm positioning pins 15 so as not to interfere with free movement of member 16 and the arms. The inherent flexibility of the arms permits sufficient downward movement of the position indicating member 16 to cause the pin 20 to mark the map.

A modified position indicating member 21 is illustrated in Fig. 8 and has headed portion 22 and a centrally located opening 23 extending through the member. The member is held in place as before by the washer 18 and the wing nut 19. The location of the modified member 21 may be marked by inserting a pencil or a pin through the central opening 23.

A further modification of the position marking device is illustrated in Fig. 9. In this form of marking device holes 24 are located at each end of each of the arms 10, 11 and 12 in line with the center line of the slots 13 in the arms. A common pin may be inserted through the holes 24 into the map to hold the arms in a fixed position.

Orientation on a map 25 which has been oriented in direction by means of a compass will be described in connection with Fig. 4. One end of each of the arms 10, 11 and 12 is fixed in position respectively at points A, B and C representing prominent terrain features as shown on the map 25. Then, with the wing nut 19 on the position indicating member 16 loose, the arms are positioned to line up the sights 14 on two of the arms with their respective actual terrain features A', B' or C' and the arms are then fixed in position by the positioning pins 15 on the opposite ends of the arms. The wing nut may then be tightened to hold the arms in place. The sights on the third arm should then line up with the actual terrain feature for that arm. If this is not the case, then the first two arms must be resighted and the procedure repeated until the three arms are each properly aligned. The position of the position indicating member 16 when this has been accomplished will indicate the position of the observer.

If the map is to be oriented in direction without a compass, two terrain features D' and E', as shown in Fig. 5, are selected by observation and a line D.-E. is drawn on a map 26 through terrain features D and E corresponding to the selected terrain features D' and E'. The positioning pin 15 on one end of the arm 12 is fixed on the map 26 at the terrain feature D and the pin 15 on the other end of the arm 12 is fixed on the line D.-E. The map 26 is then rotated to line up the sights 14 on the arm 12 with the terrain features D' and E'. This orients the map in direction.

The positioning pins 15 at one end of each of the arms 10 and 11 are then placed respectively on terrain features G and F on map. The procedure of aligning the sights 14 on these arms with the actual terrain features G' and F' as previously described in connection with points B' and C' is then followed. When this is accomplished the position of the position indicating device 16 will indicate the position of the observer on the map.

For restitution or transfer of a point P from one map or photograph to another, two identical points or features X and Y and X' and Y', as illustrated in Figs. 6 and 7, are selected on the maps and a line connecting these points is drawn on each map. The pin 20 on the position indicating member 16 is placed on one of the points either X or Y in Fig. 6 where the location of the point P is known and the positioning pins 15 on one of the arms are placed in position along the line X—Y. The positioning pin 15 at one end of one of the remaining arms is then positioned at P and the wing nut 19 is tightened.

The instrument is then transferred to the other map by placing the position indicating member 16 at the point X with the positioning pins 15 of the appropriate arms located on the line X'—Y'. The positioning pin 15 on the arm representing the point P will then be marked at $xp$. This operation is repeated from the point Y and the location of $yp$ is determined.

Lines connecting the points X' and P' and the points $xp$ and $yp$ respectively intersect at a point P' which represents the location of the point P on the new map. In this application of the instrument the location of the third arm is not material and it may be placed in a position where it will not interfere with the other arms.

While a preferred embodiment of apparatus incorporating the present invention has been described, it will be obvious to those skilled in the art that certain modifications may be made without departing from the scope of the invention.

Having thus described my invention, what I claim as new and wish to secure by Letters Patent is:

1. A plotting instrument comprising a trio of arms, an indicating device pivotally supporting said arms in superimposed relation, said device being shiftable lengthwise of the arms, front and rear sights mounted adjacent the extremities of said arms for aligning the latter with respect to distant objects, the alignment of said arms relative to said distant objects disposing said device in a position indicative of a predetermined point, means in connection with said arms and located in advance of the front and rear sights for securing said arms in their adjusted position, and means carried by said device for clamping said arms and device in fixed relation.

2. A plotting instrument comprising a trio of arms, an indicaing device supporting said arms in superimposed relation, said device being shiftable lengthwise of the arms, front and rear sights mounted adjacent the extremities of said arms for aligning the latter with respect to distant objects, the alignment of said arms relative to said distant objects disposing said device in a position indicative of a predetermined point, prong means located in advance of said front and rear sights and depending from the extremities of said arms for securing them in adjusted position, and means carried by said device for clamping said arms and device in fixed relation.

3. A plotting device comprising a trio of superimposed longitudinally slotted arms, an indicating device pivotally supporting said arms for relative adjustment, said device including a pivotal member projecting through the slots in said arms, and a clamping element carried by said member for securing said arms and device in fixed relation, front and rear sights mounted adjacent the extremities of said arms for aligning the latter with respect to distant objects, the alignment of said arms relative to distant objects disposing said device in a position along the length of said arms indicative of a predetermined point, prong means located beneath the front and rear sights and depending from the extremities of said arms for securing them in adjusted position, and marker means associated with said indicating device.

4. A plotting instrument comprising a set of three movable arms, each of said arms having a centrally located slot extending along its length, a movable position indicating device supporting said arms for relative adjustment, said device including a pivotal member extending through the slots in the arms to hold the latter in adjustable relation, sighting means mounted on the ends of each of the arms for effecting their alignment with respect to distant objects, means for securing each of the arms in aligned position, and means carried by said pivotal member for clamping said arms and device in fixed relation.

FRANCIS M. RUSHMORE.

REFERENCES CITED

The following references are of record in the file of this patent:

UNITED STATES PATENTS

| Number | Name | Date |
|---|---|---|
| 1,009,214 | Backstrom | Nov. 21, 1911 |
| 1,039,057 | Hill | Sept. 17, 1912 |